United States Patent [19]

Settles et al.

[11] Patent Number: 5,777,894
[45] Date of Patent: Jul. 7, 1998

[54] MONITORING AND PROTECTING DRIVES CONTROLLED WITH MICROCONTROLLER

[75] Inventors: Steven Ray Settles, Sterling Heights; John Andrew Barrs, Clawson; Darrell James Kolomyski, Chesterfield, all of Mich.

[73] Assignee: UT Automotive Dearborn, Inc., Dearborn, Mich.

[21] Appl. No.: 967,465

[22] Filed: Oct. 26, 1992

[51] Int. Cl.$^6$ .................................................. H04B 3/46
[52] U.S. Cl. .................................................. 364/550
[58] Field of Search ............................ 364/550; 361/191, 361/59, 90, 91, 92, 93, 111; 73/119 A; 363/41; 307/10.1, 36, 38, 41, 60, 61, 62, 63

[56] References Cited

U.S. PATENT DOCUMENTS

| | | | |
|---|---|---|---|
| 4,262,320 | 4/1981 | Herron | 361/191 |
| 4,511,947 | 4/1985 | Melocik et al. | 361/191 |
| 4,853,820 | 8/1989 | Ham, Jr. et al. | 361/59 |
| 4,932,246 | 6/1990 | Deutsch et al. | 73/119 A |

*Primary Examiner*—Thomas Peeso
*Attorney, Agent, or Firm*—Robert E. Greenstien

[57] ABSTRACT

In a microcontroller-based system that controls the operation of equipment such as lights and wipers in an automobile, overcurrent is detected by comparing the total current through the device with a stored level. If the detected current is excessive the devices are independently activated and the current through each device is compared with stored current level for the device. A device having an overcurrent condition is inactivated and the remaining devices are activated.

4 Claims, 2 Drawing Sheets

MONITORING AND PROTECTING DRIVES CONTROLLED WITH MICROCONTROLLER

CROSS REFERENCE

This application describes apparatus also described in the application entitled "Reducing Input Signal Levels To A Microcontroller" by Steven R. Settles and Darrell J. Kolomyski [Attorney Docket No. AG-986] and application entitled "Monitoring The Characteristics Of A Load Driver Controlled By A Microcontroller" by John A. Barrs and Darrell J. Kolomyski [Attorney Docket No. AG-936], both applications being assigned to United Technologies Automotive, Inc. and filed simultaneously herewith.

TECHNICAL FIELD

This invention relates to techniques for operating drives, for example, a relay in an automobile, and in particular, operating, monitoring and protecting drives with a microcontroller.

BACKGROUND OF THE INVENTION

The proliferation of microcontrollers in automobile systems is an important advance, making it possible to control many functions economically and precisely as compared to the simple switches of the past. The microcontroller typically forms part of what may be called "electronic module" using analog and digital converters to provide multiple digital and analog inputs and outputs through which the microcontroller interfaces with analog and digital input devices, such as switches, potentiometers and sensors. The Motorolla model MC68HC05B6 controller, an example of a low cost controller, is used in the electronic module of some automobiles. This controller, however, has a limited number of analog and digital inputs and outputs, placing some practical limitations on the number of input channels to the module, and the aforementioned applications describe apparatus related to techniques for connecting control switches to such a module.

In an automobile application, the microcontroller typically produces a drive signal to a semi-conductor drive circuit, such as an emitter follower that may provide power directly to a load such as a headlight. But usually a moderate power transistor drives a power relay, connecting battery power to the device, a preferred power switching arrangement considering the costs and installation considerations for power transistors. Regardless of the type of device or load, the load and drive must be protected from overcurrents. Techniques that can anticipate drive and load problems before they occur are needed because transistor drive damage can occur over a long period of time from repeated overcurrent conditions, for example, if there is a short on the load connected to the drive. Fuses and circuit breakers do not have that capability.

DISCLOSURE OF THE INVENTION

Among the objects of the present invention is to provide an improved technique for monitoring and diagnosing drive characteristics in a system using a microcontroller to actuate drives connected to a variety of loads, such as control relays, windshield wipers, headlights and window operators in an automobile.

According to the present invention, an overcurrent is detected by comparing the current level with a stored level based on the drives that are activated. When an overcurrent is present, each drive is separately activated and the current for that drive is compared with a stored current level associated with the drive. According to the present invention, a microcontroller provides an output signal to a latch with n outputs, each connected to a drive. Each drive causes current flow through a load. Drive and load current for all the drives and load is sensed by a common current sensor, producing a current sense signal. The magnitude of the current sense signal is compared with a reference, and the latch is reset if the reference is exceeded, momentarily turning off all n drives as the microcontroller begins to operate each drive sequentially, measuring the current for each, from which it determines the drive with the overcurrent. That drive is disabled and all the other drives are enabled. The reference voltage is adjusted by the microcontroller as a function of the number of drives that are activated.

According to the invention, the reference voltage is produced by filtering a PWM signal in which the duty cycle is varied as a function of the loads that are activated.

A feature of the present invention is that because overcurrent sensitivity is programmed to match the actual loads, a control system embodying the present invention is fundamentally universal, capable of adaption to a host of different load combinations. Also, the invention affords a reliable, inexpensive way of diagnosing an overcurrent condition and disabling operation of the device without sacrificing sensitivity.

Other objects, benefits and features of the invention will be apparent to one skilled in the art from the following discussion.

BEST MODE FOR CHARGING OF THE INVENTION

Figure 1:
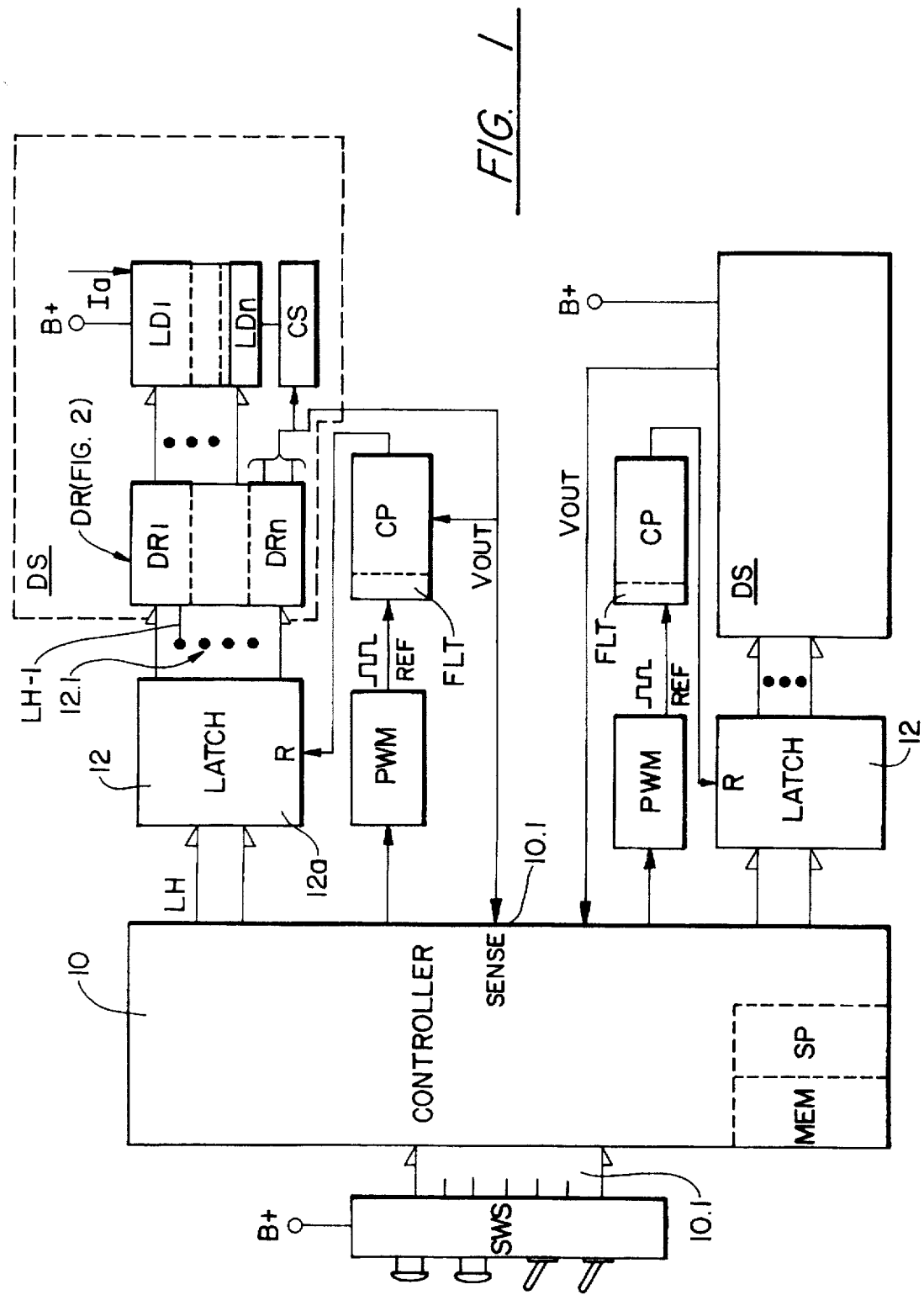
FIG. 1 is a functional block diagram of a system for controlling a plurality of loads embodying the present invention.
Figure 2:
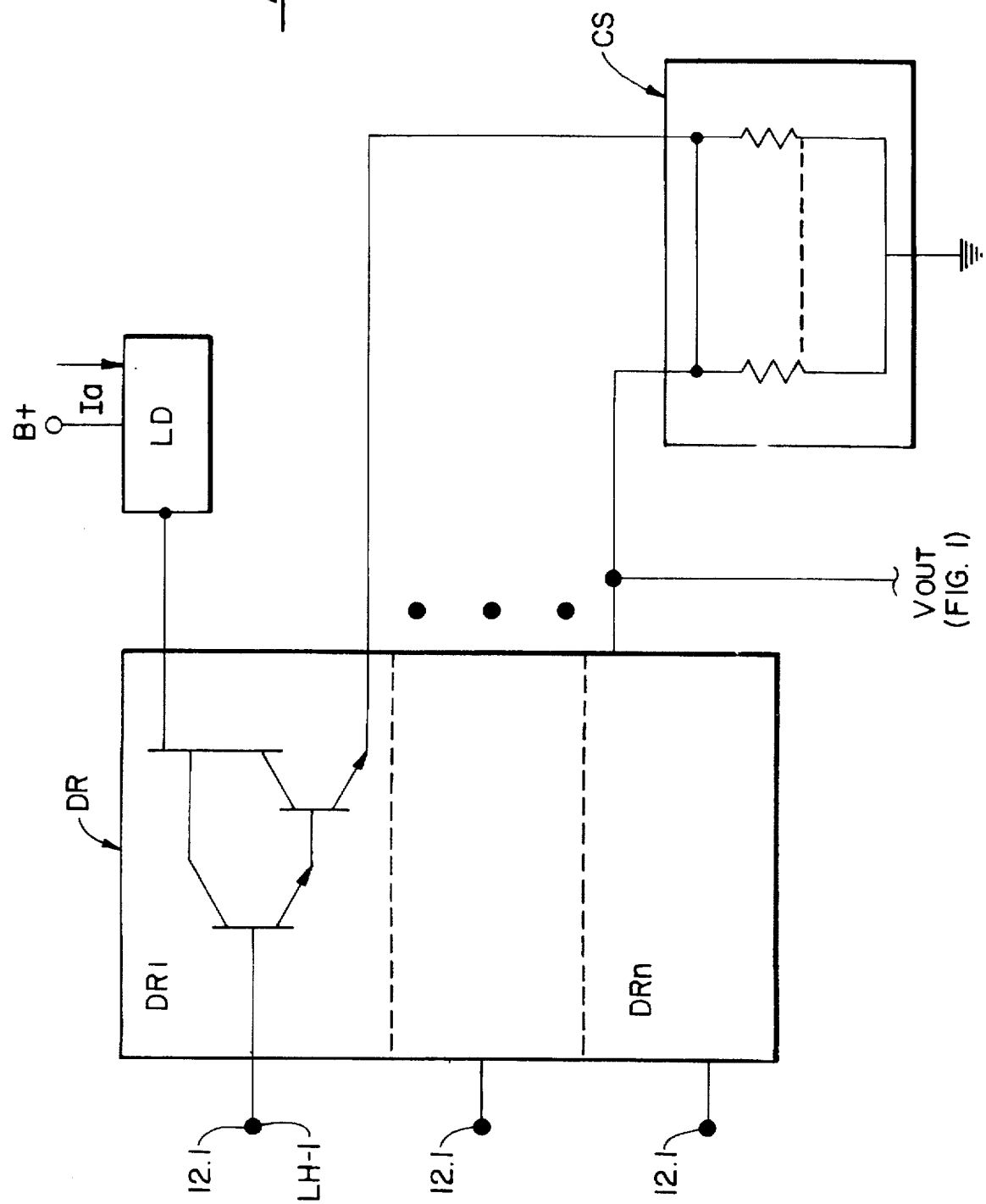
FIG. 2 is a functional block diagram of a drive and current sense section of the system shown in FIG. 1.

Referring to FIG. 1, a plurality of switches SWS are connected to a power supply B+(e.g an automobile battery). Each switch is connected to a controller 10 over a plurality of lines 10.1. The controller in this particular embodiment is connected to two latches 12, and each latch has output lines 12.1. Each line 12.1 is connected to a driver DRn. Each switch SWS is operable to prompt the controller to change the state of one of the lines 12.1 to operate one of the drivers. When a driver is turned on, current flows through a corresponding load LDn (e.g. a relay) from the B+ supply. A current sense CS carries all the current Ic for the drivers and loads. The voltage from the current sense Vout is supplied to a sense input 10.2 on the controller. It is assumed that this input actually connects to an analog to digital converter (not shown) producing a binary signal equivalent of Vout that is stored and recalled by the controller for the diagnostics discussed below. Vout is also supplied to a comparator CP, where it is compared with a reference voltage REF. A pulse width modulator PWM is connected to the controller, which varies the duty cycle of signal REF in proportion to Vout, dynamically adjusting the reference voltage REF in relation to the load (since Vout is a function of the current through current sense CS). For simplicity, it is assumed that although REF constitutes a waveform consisting of variable duration pulse square waves, the comparison with Vout is made using the average value of signal REF. This may be accomplished with an RC filter (smoothing circuit) FLT on the line carrying signal REF to the comparator, shown, for simplicity, as part of the comparator. FIG. 2 shows that each driver comprises a Darlington emitter-follower and that current from each of the drivers passes the current sense CS, which can comprise a plurality of resistors present to distribute the considerable heat dissipation that can occur. Operation of the two latches is fundamentally identical and so for clarity the operation will be discussed with reference to only one latch 12a. As explained previously, each latch controls a driver with a dedicated line that turns the driver fully on when the line is high and turns the driver off when the line is low.

When operating, the controller receives Vout to control the duty cycle of the PWM, establishing the reference voltage REF appropriate for the loads that are receiving power based upon parameters for each driver stored in the controller memory accessed through a programmed signal processor SP. The controller (signal processor) of course knows how many loads are operating from the status of the switches SWS. From this it knows what the value of Vout should be for the known value of resistance of current sense CS. Assume that one drive DRI is activated when the state of line LH-1 changes in response to a particular binary signal value LHS on the parallel latch control lines LH-2. If the load LD1 decreases, for example due to an internal short or a motor stall, Vout will rise. It exceeds the value of REF, the output from the comparator CP will reset the latch momentarily, turning off all drives. It should be understood, of course, that the following process occurs very rapidly and that the time constant of the system is so long that the process is imperceptible from the loads, e.g. due to thermal and mechanical inertia. When the latches are reset, the controller enters a test routine for each drive that is activated. The latch is sequenced to actuate each of the drives individually, a process accomplished by changing the value of the latch control signal or drive address LHS. As this happens, the controller monitors the value of Vout, comparing it to a stored value for what Vout should be when each driver is operating correctly (i.e the load is correct). In this example, it determines that LD1 is in an overcurrent condition and sets a flag for that drive, disabling it. Then, the other drives are simultaneously activated again based upon the state of their corresponding switches SWS. The reference level REF is readjusted, as before, by controlling the PWM, based upon the switches that are operated. Thus with drive LD1 disabled the value for Vout would be somewhat lower. Also, when a load error is detected, an indication can be provided to the operator.

While the foregoing is a description of the best mode for carrying out the invention, it may permit one skilled in the art to make modifications and variations without departing from the true scope and spirit of the invention set forth in the claims.

We claim:

1. A control system comprising:
   a plurality of loads;
   a drive for each load; and
   switch means for operating each drive; characterized by:
   means for providing a reference signal with a magnitude that is a function of a received reference control signal;
   means for providing a sense signal indicating total current through the loads;
   means for comparing the sense signal and said reference signal to produce a reset signal when the sense signal is at least as great as said reference signal;
   means for producing first output signals that activate each drive simultaneously in response to a first control signal, for producing second output signals that activate each drive sequentially in response to a second control signal and for removing the first output in response to the reset signal;
   signal processing means for providing said first control signal in response to operation of switch means, for providing said second control signal in response to said reset signal, for providing said reference control signal in response to said switch means, for controlling the magnitude of the reference signal as function of the drives that are operated by the switches based on stored parameters for each drive, and for disabling the second signal for a specific drive when the current to the drive exceeds the value stored for the drive.

2. A control system as described in claim 1, further characterized in that:
   said means for producing said first output signals, comprises a latch with n outputs, each output connected to a drive, said first control signal changes the state of a latch output to activate a drive, and said second control signal sequentially addresses latch outputs.

3. A control system as described in claim 1, further characterized in that:
   said means for providing the reference signal comprises means for producing a pulse width modulated output signal and means for producing an average value of the pulse width modulated output signal; and
   said received reference signal varies the duty cycle of the pulse width modulated output signal.

4. A method for controlling a plurality of drives characterized by the steps:
   storing signals for each drive representing a proper current level for the drive;
   providing an address indicative of a first set of the drives to actuate;
   simultaneously turning on said first set of drives in response to said address;
   comparing a first current signal with a stored current signal to produce a reset signal when the first current signal at least equals the stored current signal, the current signal manifesting the combined current of the first set of drives, the stored current signal manifesting a computed total current for the first set of drives based on the stored signals;
   turning off the first set of drives in response to said reset signal;
   sequentially activating each drive in the first set and comparing the current through each drive with a stored current for the drive to produce a signal that disables a drive if the difference between the current through the drive and the stored current exceeds a preset, stored magnitude; and
   simultaneously activating the drives in a second set of drives comprising said first set of drives excluding a disabled drive.

\* \* \* \* \*